(12) United States Patent
Shirao

(10) Patent No.: US 9,133,862 B2
(45) Date of Patent: *Sep. 15, 2015

(54) WORK VEHICLE AND METHOD FOR CONTROLLING WORK VEHICLE

(71) Applicant: KOMATSU LTD., Tokyo (JP)

(72) Inventor: Atsushi Shirao, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/164,745

(22) Filed: Jan. 27, 2014

(65) Prior Publication Data

US 2015/0082779 A1    Mar. 26, 2015

Related U.S. Application Data

(63) Continuation of application No. 13/583,861, filed as application No. PCT/JP2012/062162 on May 11, 2012, now Pat. No. 8,666,610.

(30) Foreign Application Priority Data

Mar. 15, 2012   (JP) .................................. 2012-058569

(51) Int. Cl.
    *G06F 19/00*    (2011.01)
    *F15B 11/08*    (2006.01)
    (Continued)

(52) U.S. Cl.
    CPC ................. *F15B 11/08* (2013.01); *B60W 10/06* (2013.01); *B60W 10/30* (2013.01); *E02F 3/36* (2013.01);
    (Continued)

(58) Field of Classification Search
    CPC ................ B60W 10/06; B60W 10/30; B60W 2510/0638; B60W 2510/0666; B60W 2510/088; E02F 9/2253; E02F 9/2289; E02F 9/2292; E02F 9/2296; E02F 3/36; E02F 3/422; E02F 9/2246; B60Y 2200/412; F16H 61/421; F16H 61/47
    USPC .......................... 701/36, 50; 172/4.5; 414/685
    See application file for complete search history.

(56) References Cited

U.S. PATENT DOCUMENTS

| 4,785,782 A | 11/1988 | Tanaka et al. |
| 6,058,346 A | 5/2000 | Wachi et al. |

(Continued)

FOREIGN PATENT DOCUMENTS

| EP | 1 666 711 A1 | 6/2006 |
| EP | 1 820 908 A1 | 8/2007 |

(Continued)

OTHER PUBLICATIONS

International Search Report for the corresponding international application No. PCT/JP2012/062162, issued on Aug. 14, 2012.

(Continued)

*Primary Examiner* — Gertrude Arthur Jeanglaude

(74) *Attorney, Agent, or Firm* — Global IP Counselors, LLP

(57) ABSTRACT

A control unit of the work vehicle is configured to set an upper limit of a throttle opening degree based on third throttle upper limit information when a work vehicle is performing excavation work and when work implement is not in use, to set the upper limit based on the second throttle upper limit information when the work vehicle is performing excavation work and when the work implement is in use, and to set the upper limit based on the first throttle upper limit information when an angle of a boom is equal to or greater than a predetermined angle, even when the work vehicle is performing excavation work. The second throttle upper limit information specifies a lower upper limit than the first throttle upper limit information, and the third throttle upper limit information specifies a lower upper limit than the second throttle upper limit information.

5 Claims, 12 Drawing Sheets

(51) Int. Cl.

| | | |
|---|---|---|
| *E02F 3/36* | (2006.01) | |
| *E02F 3/42* | (2006.01) | |
| *B60W 10/06* | (2006.01) | |
| *E02F 9/22* | (2006.01) | |
| *F16H 61/421* | (2010.01) | |
| *F16H 61/47* | (2010.01) | |
| *B60W 10/30* | (2006.01) | |
| *F15B 13/02* | (2006.01) | |

(52) U.S. Cl.
CPC ............... *E02F 3/422* (2013.01); *E02F 9/2246* (2013.01); *E02F 9/2253* (2013.01); *E02F 9/2289* (2013.01); *E02F 9/2292* (2013.01); *E02F 9/2296* (2013.01); *F15B 13/02* (2013.01); *F16H 61/421* (2013.01); *F16H 61/47* (2013.01); *B60W 2510/0638* (2013.01); *B60W 2510/0666* (2013.01); *B60W 2510/088* (2013.01); *B60Y 2200/412* (2013.01)

(56) References Cited

U.S. PATENT DOCUMENTS

| | | | |
|---|---|---|---|
| 7,472,684 | B1 | 1/2009 | McKee et al. |
| 8,152,690 | B2 | 4/2012 | Hatanaka |
| 8,262,540 | B2 | 9/2012 | Higaki et al. |
| 8,666,610 | B2 * | 3/2014 | Shirao .............................. 701/50 |
| 2004/0128868 | A1 | 7/2004 | Helbling et al. |
| 2006/0150624 | A1 | 7/2006 | Shah |
| 2006/0161324 | A1 | 7/2006 | Ozawa et al. |
| 2009/0247356 | A1 | 10/2009 | Hatanaka |
| 2009/0265065 | A1 | 10/2009 | Ikari |

FOREIGN PATENT DOCUMENTS

| | | |
|---|---|---|
| GB | 2 417 793 A | 3/2006 |
| JP | 10-273919 A | 10/1998 |
| JP | 2007-107651 A | 4/2007 |
| JP | 2008-223815 A | 9/2008 |
| JP | 2008-275012 A | 11/2008 |
| JP | 2011-202531 A | 10/2011 |
| WO | 2007/074608 A1 | 7/2007 |
| WO | 2011/138880 A1 | 11/2011 |

OTHER PUBLICATIONS

The extended European search report for the corresponding European application No. 12784409.0, issued on Apr. 29, 2014.

* cited by examiner

| TRACTION CONTROL | ON | | | | OFF |
|---|---|---|---|---|---|
| WORK PHASE | EXCAVATION | | WORK OTHER THAN EXCAVATION | | |
| SCOOPING WORK | — | ON | — | — | — |
| USE OF WORK IMPLEMENT OR INCHING | OFF | — | OFF | ON | — |
| THROTTLE UPPER LIMIT MAP | THIRD THROTTLE UPPER LIMIT MAP | SECOND THROTTLE UPPER LIMIT MAP | SECOND THROTTLE UPPER LIMIT MAP | FIRST THROTTLE UPPER LIMIT MAP | FIRST THROTTLE UPPER LIMIT MAP |

FIG. 11

WORK VEHICLE AND METHOD FOR CONTROLLING WORK VEHICLE

CROSS-REFERENCE TO RELATED APPLICATIONS

This is a continuation application of U.S. patent application Ser. No. 13/583,861. This application claims priority to Japanese Patent Application No. 2012-058569 filed on Mar. 15, 2012. The entire disclosures of U.S. patent application Ser. No. 13/583,861 and Japanese Patent Application No. 2012-058569 are hereby incorporated herein by reference.

TECHNICAL FIELD

The present invention relates to a work vehicle and a method for controlling a work vehicle.

BACKGROUND ART

Some wheel loaders and other work vehicles are commonly equipped with a so-called hydrostatic transmission (HST). As described in Japanese Laid-open Patent Application No. 2008-275012, in an HST-type work vehicle, a hydraulic pump is driven by an engine, and a travel hydraulic motor is driven by hydraulic fluid discharged from the hydraulic pump. The work vehicle is thereby made to travel. In such an HST-type work vehicle, the vehicle speed and traction force can be controlled by controlling the engine speed, the displacement of the hydraulic pump, the displacement of the travel hydraulic motor, and other factors.

The work vehicle is also provided with an engine controller, and the engine controller controls the output of the engine in accordance with a pre-set engine output torque curve. FIG. 13 is a view showing an example of the engine output torque curve. The engine output torque curve indicates the upper limit value of the torque that can be outputted by the engine in accordance with the engine speed. The engine controller controls an engine fuel injection device so that a target engine speed that is in accordance with a set throttle opening degree is obtained. The throttle opening degree is set in accordance with an operation amount (hereinafter referred to as "accelerator operation amount") of an accelerator operation member operated by an operator. In FIG. 13, the solid line L100 indicates the engine output torque curve when the accelerator operation amount is 100%. This engine output torque curve corresponds to, e.g., the rated or maximum power output of the engine. The broken line L75 indicates the engine output torque curve when the accelerator operation amount is 75% in a high-load work phase. The engine controller controls the output of the engine so that the output torque of the engine is equal to or less than the engine output torque curve.

SUMMARY

In the work vehicle described above, the engine speed and the output torque can be controlled within the range of the engine output torque curve in accordance with a load. Therefore, when the accelerator operation amount is set to 100% in a state where the load is small, the work vehicle is operated in a state in which the output of the engine is within a low-load, high engine-speed region R, such as shown in FIG. 13. Operating in such a state contributes to reduced fuel economy.

Use of the engine in the low-load, high engine-speed region described above can be prevented by performing control for reducing the upper limit of the throttle opening degree. However, when the upper limit of the throttle opening degree is reduced irrespective of the travel state and/or work status of the work vehicle, there is a risk that the necessary engine output will no longer be adequately obtained. In this case, it is impossible for the work vehicle to have adequate travel characteristics or ease of operation.

An object of the present invention is to provide a work vehicle and method for controlling a work vehicle whereby fuel economy can be enhanced with minimal reduction in travel characteristics or ease of operation of the work vehicle.

A work vehicle according to one aspect includes an engine, a throttle opening degree setting unit configured to set a throttle opening degree of the engine, a first hydraulic pump driven by the engine, a travel hydraulic motor driven by hydraulic fluid discharged from the first hydraulic pump, a second hydraulic pump driven by the engine, a work implement driven by hydraulic fluid discharged from the second hydraulic pump having a bucket and a boom for supporting the bucket, a first control unit configured to set an upper limit for the throttle opening degree in accordance with a determination result as to whether or not the work vehicle is performing excavation work, and a second control unit configured to control output of the engine based on the smaller of the throttle opening degree set by the throttle opening degree setting unit and the throttle opening degree set by the first control unit. The first control unit is configured to set the upper limit of the throttle opening degree based on throttle upper limit information for specifying the upper limit of the throttle opening degree with respect to vehicle speed. The throttle upper limit information includes first throttle upper limit information, second throttle upper limit information for specifying a lower upper limit of the throttle opening degree with respect to the vehicle speed than the first throttle upper limit information, and third throttle upper limit information for specifying a lower upper limit of the throttle opening degree with respect to the vehicle speed than the second throttle upper limit information. The first control unit is configured to set the upper limit of the throttle opening degree based on the third throttle upper limit information when the determination result indicates that the work vehicle is performing excavation work and when the work implement is not in use. The first control unit is configured to set the upper limit of the throttle opening degree based on the second throttle upper limit information when the determination result indicates that the work vehicle is performing excavation work and when the work implement is in use. The first control unit is configured set the upper limit of the throttle opening degree based on the first throttle upper limit information when an angle in a longitudinal direction of the boom, defined so that a value of the angle increases upward, is equal to or greater than a predetermined angle, even when the determination result indicates that the work vehicle is performing excavation work.

BRIEF DESCRIPTION OF THE DRAWINGS

FIG. 11 is a table showing the throttle upper limit map selected for each work phase;

DESCRIPTION OF EMBODIMENTS

Figure 1:
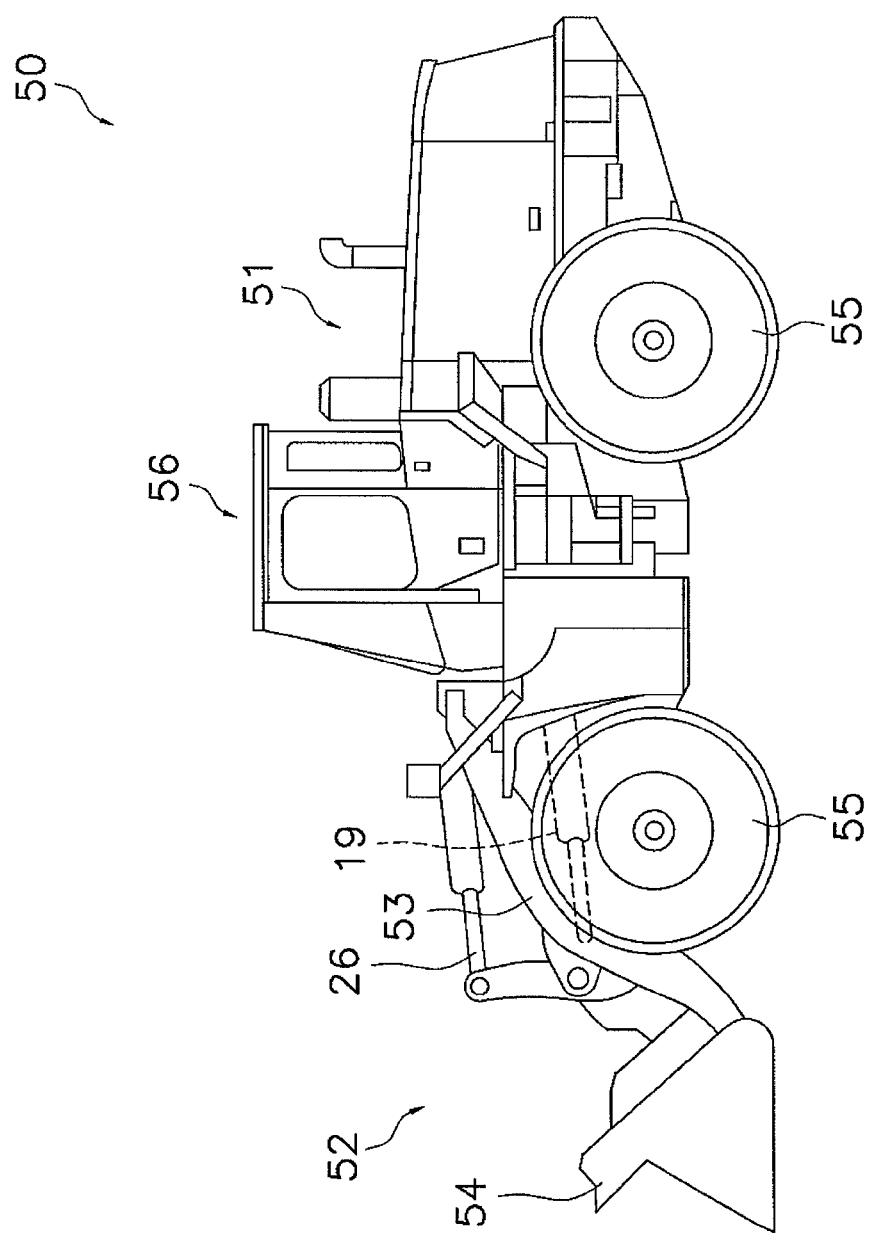
FIG. 1 is a side view showing the configuration of the work vehicle according to an embodiment of the present invention.

A work vehicle 50 according to an embodiment of the present invention is described hereinafter with reference to the attached drawings. FIG. 1 is a side view of the work vehicle 50. The work vehicle 50 is a wheel loader. The work vehicle 50 is provided with a vehicle body 51, a work implement 52, a plurality of tires 55, and a cab 56. The work implement 52 is installed on a front part of the vehicle body 51. The work implement 52 has a boom 53, a bucket 54, a lift cylinder 19, and a bucket cylinder 26. The boom 53 is a member for raising the bucket 54. The boom 53 is driven by the lift cylinder 19. The bucket 54 is attached to a distal end of the boom 53. The bucket 54 is dumped and tilted by the bucket cylinder 26. The cab 56 is disposed above the vehicle body 51.

Figure 2:
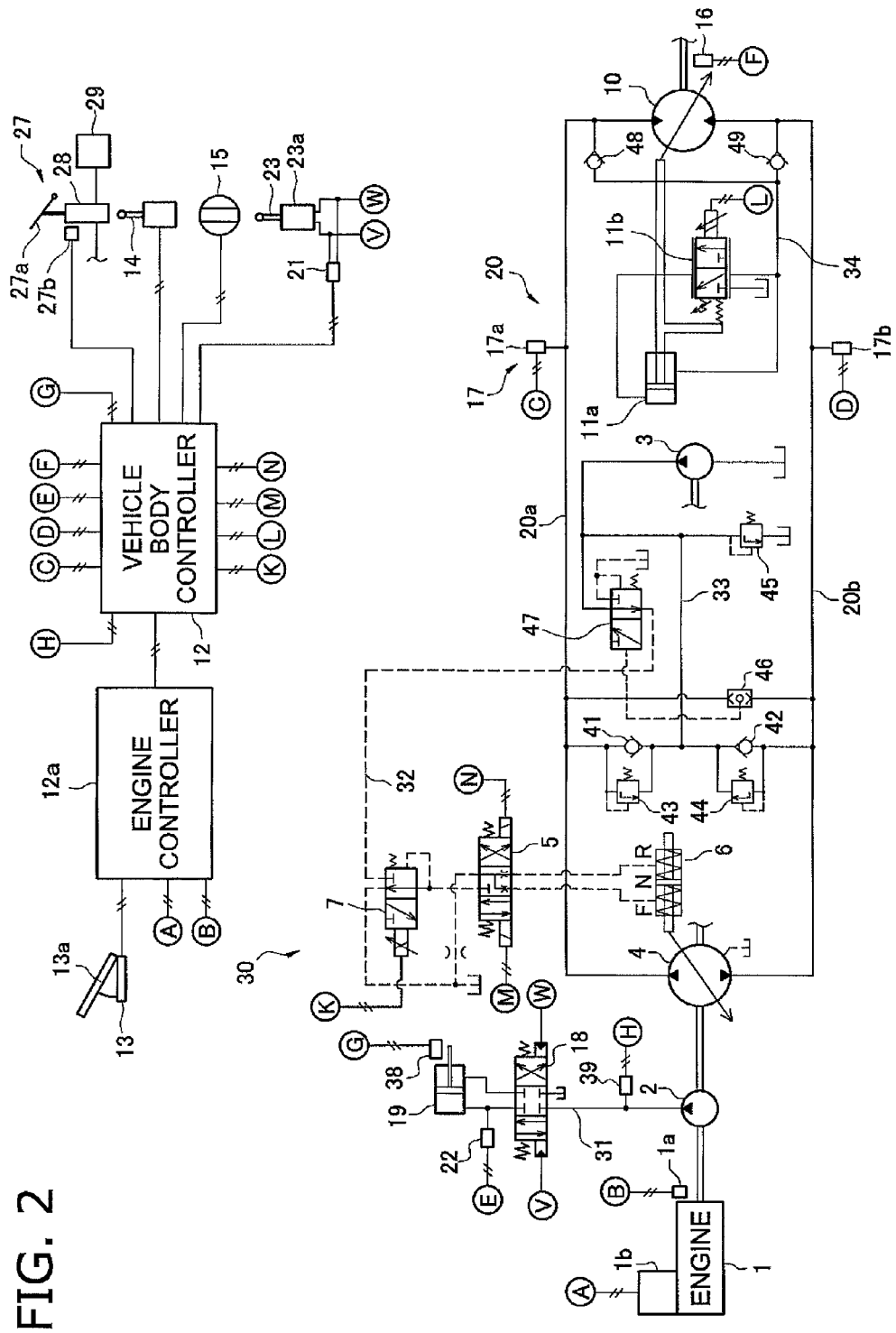
FIG. 2 is a hydraulic circuit diagram showing the HST system equipped in the work vehicle according to an embodiment of the present invention.

FIG. 2 is a block diagram showing the configuration of a hydraulic drive mechanism 30 equipped in the work vehicle 50. The hydraulic drive mechanism 30 primarily comprises an engine 1, second hydraulic pump 2, a charge pump 3, a first hydraulic pump 4, a travel hydraulic motor 10, an engine controller 12a, a vehicle body controller 12, and a drive hydraulic circuit 20. In the hydraulic drive mechanism 30, the first hydraulic pump 4 is driven by the engine 1 to discharge hydraulic fluid. The travel hydraulic motor 10 is driven by the hydraulic fluid discharged from the first hydraulic pump 4. The travel hydraulic motor 10 drives rotation of the abovementioned tires 55, and the work vehicle 50 thereby travels. Specifically, a so-called one-pump one-motor HST system is employed in the hydraulic drive mechanism 30.

The engine 1 is a diesel engine, and the output torque produced by the engine 1 is transmitted to the second hydraulic pump 2, the charge pump 3, the first hydraulic pump 4, and other components. The hydraulic drive mechanism 30 is provided with an engine speed sensor 1a for detecting the actual rotation speed of the engine 1. A fuel injection device 1b is connected to the engine 1. The engine controller 12a described hereinafter controls the output torque (hereinafter referred to as "engine torque") and rotation speed of the engine 1 by controlling the fuel injection device 1b in accordance with the set throttle opening degree.

The first hydraulic pump 4 is driven by the engine 1, and thereby discharges hydraulic fluid. The first hydraulic pump 4 is a variable-displacement hydraulic pump. The hydraulic fluid discharged from the first hydraulic pump 4 is sent through the drive hydraulic circuit 20 to the travel hydraulic motor 10. Specifically, the drive hydraulic circuit 20 has a first drive circuit 20a and a second drive circuit 20b. Supplying the hydraulic fluid from the first hydraulic pump 4 to the travel hydraulic motor 10 via the first drive circuit 20a causes the travel hydraulic motor 10 to be driven in one direction (e.g., the forward direction). Supplying the hydraulic fluid from the first hydraulic pump 4 to the travel hydraulic motor 10 via the second drive circuit 20b causes the travel hydraulic motor 10 to be driven in the other direction (e.g., the reverse direction).

The drive hydraulic circuit 20 is provided with a drive circuit pressure detector 17. The drive circuit pressure detector 17 detects the pressure (hereinafter referred to as "drive circuit pressure") of the hydraulic fluid that is supplied to the travel hydraulic motor 10 via the first drive circuit 20a or the second drive circuit 20b. Specifically, the drive circuit pressure detector 17 has a first drive circuit pressure sensor 17a and a second drive circuit pressure sensor 17b. The first drive circuit pressure sensor 17a detects the hydraulic pressure of the first drive circuit 20a. The second drive circuit pressure sensor 17b detects the hydraulic pressure of the second drive circuit 20b. The first drive circuit pressure sensor 17a and the second drive circuit pressure sensor 17b send detection signals to the vehicle body controller 12. A pump displacement control cylinder 6 and an FR switch unit 5 for controlling the discharge direction of the first hydraulic pump 4 are connected to the first hydraulic pump 4.

The FR switch unit 5 is an electromagnetic control valve for switching the direction in which hydraulic fluid is supplied to the pump displacement control cylinder 6, on the basis of a control signal from the vehicle body controller 12. The FR switch unit 5 switches the discharge direction of the first hydraulic pump 4 by switching the direction in which hydraulic fluid is supplied to the pump displacement control cylinder 6. Specifically, the FR switch unit 5 switches the discharge direction of the first hydraulic pump 4 between discharge to the first drive circuit 20a and discharge to the second drive circuit 20b. The pump displacement control cylinder 6 is driven by a supply of hydraulic fluid via a pump pilot circuit 32, and thereby changes the tilt angle of the first hydraulic pump 4.

A pump displacement control unit 7 is provided in the pump pilot circuit 32. The pump displacement control unit 7 is an electromagnetic control valve that is controlled on the basis of a control signal from the vehicle body controller 12. The pump displacement control unit 7 controls the flow rate of the hydraulic fluid supplied to the pump displacement control cylinder 6 via the pump pilot circuit 32.

The pump pilot circuit 32 is connected to a charge circuit 33 and a hydraulic fluid tank via a cutoff valve 47. A pilot port of the cutoff valve 47 is connected to the first drive circuit 20a and the second drive circuit 20b via a shuttle valve 46. The shuttle valve 46 introduces the larger of the hydraulic pressure of the first drive circuit 20a and the hydraulic pressure of the second drive circuit 20b to the pilot port of the cutoff valve 47. A drive circuit pressure is thereby applied to the pilot port of the cutoff valve 47. The cutoff valve 47 communicates the charge circuit 33 and the pump pilot circuit 32 when the drive circuit pressure is lower than a predetermined cutoff pressure. Hydraulic fluid is thereby supplied from the charge circuit 33 to the pump pilot circuit 32. When the drive circuit pressure is equal to or above the predetermined cutoff pressure, the cutoff valve 47 communicates the pump pilot circuit 32 with the hydraulic fluid tank to allow the hydraulic fluid of the pump pilot circuit 32 to flow to the hydraulic fluid tank. A decrease in the hydraulic pressure of the pump pilot circuit 32 thereby causes the displacement of the first hydraulic pump 4 to be reduced, and the drive circuit pressure is kept from increasing.

The charge pump 3 is a pump for supplying hydraulic fluid to the drive hydraulic circuit 20, and is driven by the engine 1. The charge pump 3 is connected to the charge circuit 33. The charge pump 3 supplies hydraulic fluid to the pump pilot circuit 32 via the charge circuit 33. The charge circuit 33 is connected to the first drive circuit 20a via a first check valve 41. The first check valve 41 allows the flow of hydraulic fluid from the charge circuit 33 to the first drive circuit 20a, but restricts the flow of hydraulic fluid from the first drive circuit 20a to the charge circuit 33. The charge circuit 33 is connected to the second drive circuit 20b via a second check valve 42. The second check valve 42 allows the flow of hydraulic fluid from the charge circuit 33 to the second drive circuit 20b, but restricts the flow of hydraulic fluid from the second drive circuit 20b to the charge circuit 33. The charge circuit 33 is connected to the first drive circuit 20a via a first relief valve 43. The first relief valve 43 is opened when the hydraulic pressure in the first drive circuit 20a becomes greater than a predetermined pressure. The charge circuit 33 is connected to the second drive circuit 20b via a second relief valve 44. The second relief valve 44 is opened when the hydraulic pressure in the second drive circuit 20b becomes greater than a predetermined pressure. The charge circuit 33 is connected to the hydraulic fluid tank via a low-pressure relief valve 45. The low-pressure relief valve 45 is opened when the hydraulic pressure in the charge circuit 33 becomes greater than a predetermined relief pressure. The drive circuit pressure is thereby adjusted so as not to exceed the predetermined relief pressure.

The second hydraulic pump 2 is driven by the engine 1. The hydraulic fluid discharged from the second hydraulic pump 2 is supplied to the lift cylinder 19 via a work implement hydraulic circuit 31. The work implement 52 is thereby driven. The hydraulic fluid discharged from the second hydraulic pump 2 is supplied to a steering cylinder (not shown) via the work implement hydraulic circuit 31. The orientation of the work vehicle 50 is thereby changed. The discharge pressure of the second hydraulic pump 2 is detected by a discharge pressure sensor 39. The discharge pressure sensor 39 sends a detection signal to the vehicle body controller 12. The work implement hydraulic circuit 31 is provided with a work implement control valve 18. The work implement control valve 18 is driven in accordance with the operation amount of a work implement operation member 23. The work implement control valve 18 controls, in accordance with the pilot pressure applied to a pilot port, the flow rate of hydraulic fluid supplied to the lift cylinder 19. The pilot pressure applied to the pilot port of the work implement control valve 18 is controlled by a pilot valve 23a of the work implement operation member 23. The pilot valve 23a applies a pilot pressure that is in accordance with the operation amount of the work implement operation member 23 to the pilot port of the work implement control valve 18. The lift cylinder 19 is thereby controlled in accordance with the operation amount of the work implement operation member 23. The pilot pressure applied to the pilot port of the work implement control valve 18 is detected by a PPC pressure sensor 21. The pressure of the hydraulic fluid supplied to the lift cylinder 19 is detected by a boom pressure sensor 22. The PPC pressure sensor 21 and the boom pressure sensor 22 send detection signals to the vehicle body controller 12. The lift cylinder 19 is provided with a boom angle detector 38. The boom angle detector 38 detects the boom angle described hereinafter. The boom angle detector 38 is a sensor for detecting the rotation angle of the boom 53. Alternatively, the boom angle detector 38 may detect the stroke amount of the lift cylinder 19 so that the rotation angle of the boom 53 is calculated from the stroke amount. The boom angle detector 38 sends a detection signal to the vehicle body controller 12.

The bucket cylinder 26 is also controlled by a control valve in the same manner as the lift cylinder 19, but this control valve is not shown in FIG. 2.

The travel hydraulic motor 10 is a variable-displacement hydraulic motor. The travel hydraulic motor 10 is driven by hydraulic fluid discharged from the first hydraulic pump 4, and generates a drive force used for travel. The travel hydraulic motor 10 is provided with a motor cylinder 11a and a motor displacement control unit 11b. The motor cylinder 11a changes the tilt angle of the travel hydraulic motor 10. The motor displacement control unit 11b is an electromagnetic control valve that is controlled on the basis of a control signal from the vehicle body controller 12. The motor displacement control unit 11b controls the motor cylinder 11a on the basis of a control signal from the vehicle body controller 12. The motor cylinder 11a and the motor displacement control unit 11b are connected to a motor pilot circuit 34. The motor pilot circuit 34 is connected to the first drive circuit 20a via a check valve 48. The check valve 48 allows the flow of hydraulic fluid from the first drive circuit 20a to the motor pilot circuit 34, but restricts the flow of hydraulic fluid from the motor pilot circuit 34 to the first drive circuit 20a. The motor pilot circuit 34 is connected to the second drive circuit 20b via a check valve 49. The check valve 49 allows the flow of hydraulic fluid from the second drive circuit 20b to the motor pilot circuit 34, but restricts the flow of hydraulic fluid from the motor pilot circuit 34 to the second drive circuit 20b. The larger of the hydraulic pressure of the first drive circuit 20a and the hydraulic pressure of the second drive circuit 20b, i.e., the hydraulic fluid at the drive circuit pressure, is supplied to the motor pilot circuit 34 by the check valves 48, 49. The motor displacement control unit 11b switches the supply direction and supply flow rate of hydraulic fluid from the motor pilot circuit 34 to the motor cylinder 11a on the basis of a control signal from the vehicle body controller 12. The vehicle body controller 12 can thereby arbitrarily change the displacement of the travel hydraulic motor 10. The maximum displacement and/or minimum displacement of the travel hydraulic motor 10 can also be arbitrarily set.

The hydraulic drive mechanism 30 is provided with a vehicle speed sensor 16. The vehicle speed sensor 16 detects the vehicle speed. The vehicle speed sensor 16 sends a vehicle speed signal to the vehicle body controller 12. The vehicle speed sensor 16 detects the vehicle speed by, for example, detecting the speed of a tire drive shaft.

The work vehicle 50 is provided with an accelerator operation member 13a, a forward/reverse switching operation member 14, a traction control selection member 15, and an inching operation unit 27.

The accelerator operation member 13a is a member for enabling the operator to set the throttle opening degree. The accelerator operation member 13a is an example of the throttle opening degree setting unit of the present invention. The accelerator operation member 13a is an accelerator pedal, for example, operated by the operator. The accelerator operation member 13a is connected to an accelerator operation amount sensor 13. The accelerator operation amount sensor 13 is composed of a potentiometer or the like. The accelerator operation amount sensor 13 sends an opening degree signal indicating the accelerator operation amount of the accelerator operation member 13a to the engine controller 12a. The operator can control the speed of the engine 1 by adjusting the accelerator operation amount.

The forward/reverse switching operation member 14 operated by the operator is switched to a forward position, a reverse position, or a neutral position. The forward/reverse switching operation member 14 sends an operation signal indicating the position of the forward/reverse switching operation member 14 to the vehicle body controller 12. The operator can switch between forward and reverse travel of the work vehicle 50 by operating the forward/reverse switching operation member 14.

The traction control selection member 15 is a dial-type switch, for example. The traction control selection member 15 is operated by the operator to set the maximum traction force produced by the traction control described hereinafter. The traction control selection member 15 sends an operation signal indicating the selection position of the traction control selection member 15 to the vehicle body controller 12.

The inching operation unit 27 has an inching operation member 27a and an inching operation sensor 27b. The inching operation member 27a is operated by the operator. The inching operation member 27a is a pedal, for example. The inching operation member 27a functions both in inching operation and braking operation, as described hereinafter. The inching operation sensor 27b detects the operation amount of the inching operation member 27a and transmits a detection signal to the vehicle body controller 12. When the inching operation member 27a is operated, the vehicle body controller 12 controls the pump displacement control unit 7 on the basis of the detection signal from the inching operation sensor 27b. The vehicle body controller 12 reduces the hydraulic pressure of the pump pilot circuit 32 in accordance with the operation amount of the inching operation member 27a. The inching operation unit 27 is used in such cases as when, for example, the operator wishes to increase the speed of the engine 1 while keeping the travel speed from increasing. Specifically, when the speed of the engine 1 is increased by an operation of the accelerator operation member 13a, the hydraulic pressure of the pump pilot circuit 32 also increases. At this time, the increase in the hydraulic pressure of the pump pilot circuit 32 can be controlled by operating the inching operation member 27a. The displacement of the first hydraulic pump 4 can thereby be kept from increasing, and the speed of the travel hydraulic motor 10 can be kept from increasing.

Figure 3:
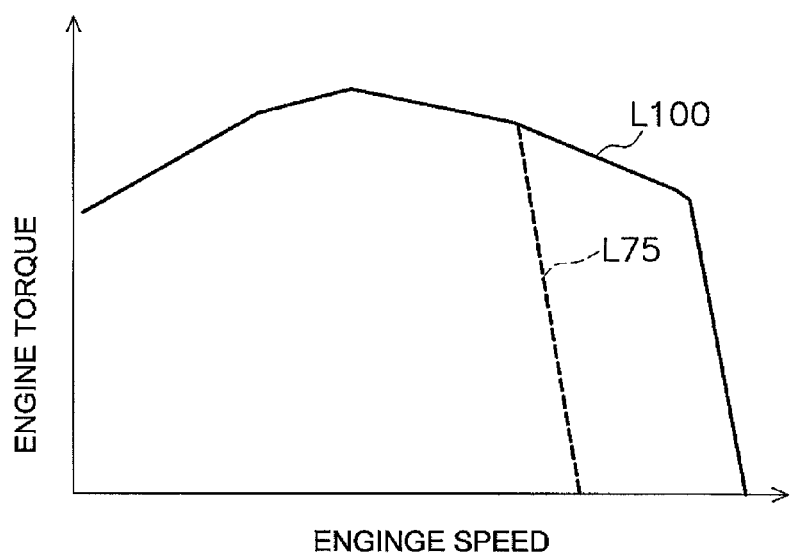
FIG. 3 is a view showing an example of the output torque curve of the engine.

A brake valve 28 is linked to the inching operation member 27a. The brake valve 28 controls the supply of hydraulic fluid to a hydraulic brake device 29. The inching operation member 27a serves also as an operation member for the hydraulic brake device 29. Until the operation amount of the inching operation member 27a reaches a predetermined amount, only the inching operation described above is performed on the basis of the detection signal from the inching operation sensor 27b. When the operation amount of the inching operation member 27a reaches the predetermined amount, the brake valve 28 begins operating, and a braking force is thereby generated in the hydraulic brake device 29. The braking force of the hydraulic brake device 29 is controlled in accordance with the operation amount of the inching operation member 27a while the operation amount of the inching operation member 27a is equal to or greater than the predetermined amount. The engine controller 12a is a CPU or other computing device and/or an electronic control unit having a memory and various other components. The engine controller 12a is an example of the second control unit of the present invention. The engine controller 12a controls the engine 1 so that a target engine speed that is in accordance with the set throttle opening degree is obtained. The output torque curve for the engine 1 is shown in FIG. 3. The output torque curve of the engine 1 indicates the relationship between the speed of the engine 1 and the magnitude of the maximum engine torque that can be output by the engine 1 at each engine speed. In FIG. 3, the solid line L100 is the engine output torque curve when the accelerator operation amount is 100% in a state (hereinafter referred to as "normal state") in which the control described hereinafter for setting the upper limit of the throttle opening degree is not performed. This engine output torque curve corresponds to, e.g., the rated or maximum power output of the engine 1. For the accelerator operation amount to be 100% means that the accelerator operation member 13a is being operated to the maximum limit thereof. The broken line L75 indicates the engine output torque curve when the accelerator operation amount is 75% in the normal state. The engine controller 12a controls the output of the engine 1 so that the engine torque is equal to or less than the engine output torque curve. The output of the engine 1 here is controlled by, for example, controlling the upper limit value of the amount of fuel injected to the engine 1.

The vehicle body controller 12 is a CPU or other computing device and/or an electronic control unit having a memory and various other components. The vehicle body controller 12 is an example of the first control unit of the present invention. The vehicle body controller 12 controls the displacement of the first hydraulic pump 4 and the displacement of the travel hydraulic motor 10 by electronically controlling various control valves on the basis of the output signals from the various detectors.

Figure 4:
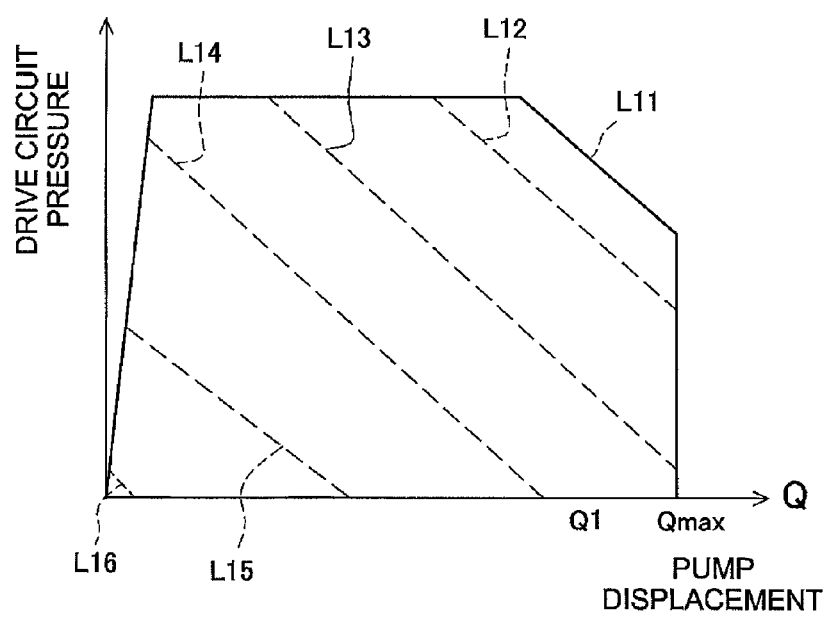
FIG. 4 is a view showing an example of the pump displacement/drive circuit pressure characteristic.

Specifically, the vehicle body controller 12 outputs a command signal to the pump displacement control unit 7 on the basis of the engine speed detected by the engine speed sensor 1a. The relationship between the pump displacement and the drive circuit pressure is thereby specified. FIG. 4 shows an example of the pump displacement/drive circuit pressure characteristic. The pump displacement/drive circuit pressure characteristic indicates the relationship between the pump displacement and the drive circuit pressure. In FIG. 4, L11 through L16 are lines indicating the pump displacement/drive circuit pressure characteristic that is changed in accordance with the engine speed. Specifically, the pump displacement/drive circuit pressure characteristic changes to L11 through L16 by the control of the flow rate of the pump displacement control unit 7 by the vehicle body controller 12 on the basis of the engine speed. The pump displacement is thereby controlled so as to correspond to the engine speed and the drive circuit pressure.

Figure 5:
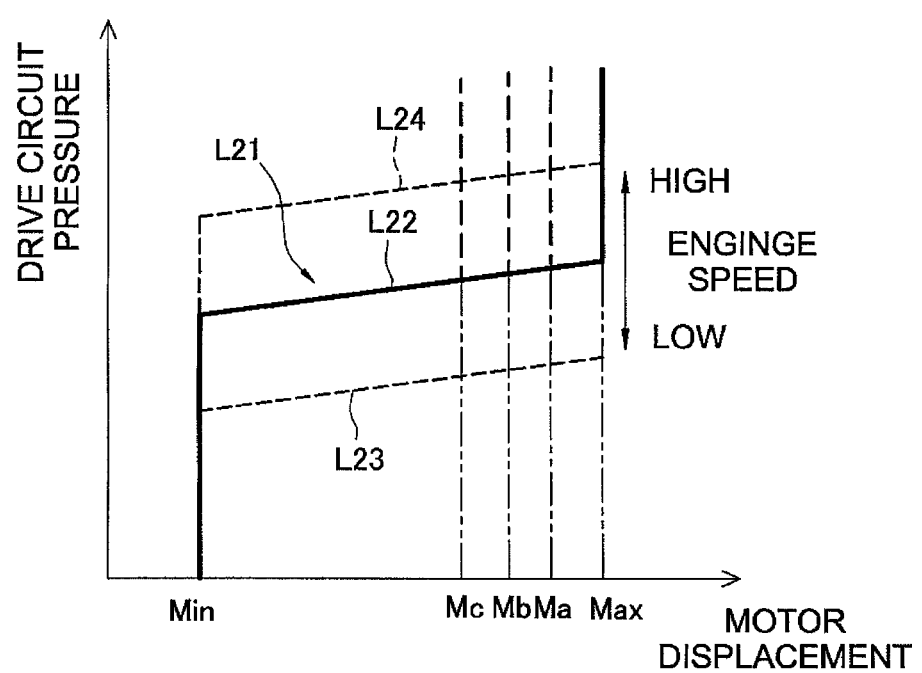
FIG. 5 is a view showing an example of the motor displacement/drive circuit pressure characteristic.
Figure 6:
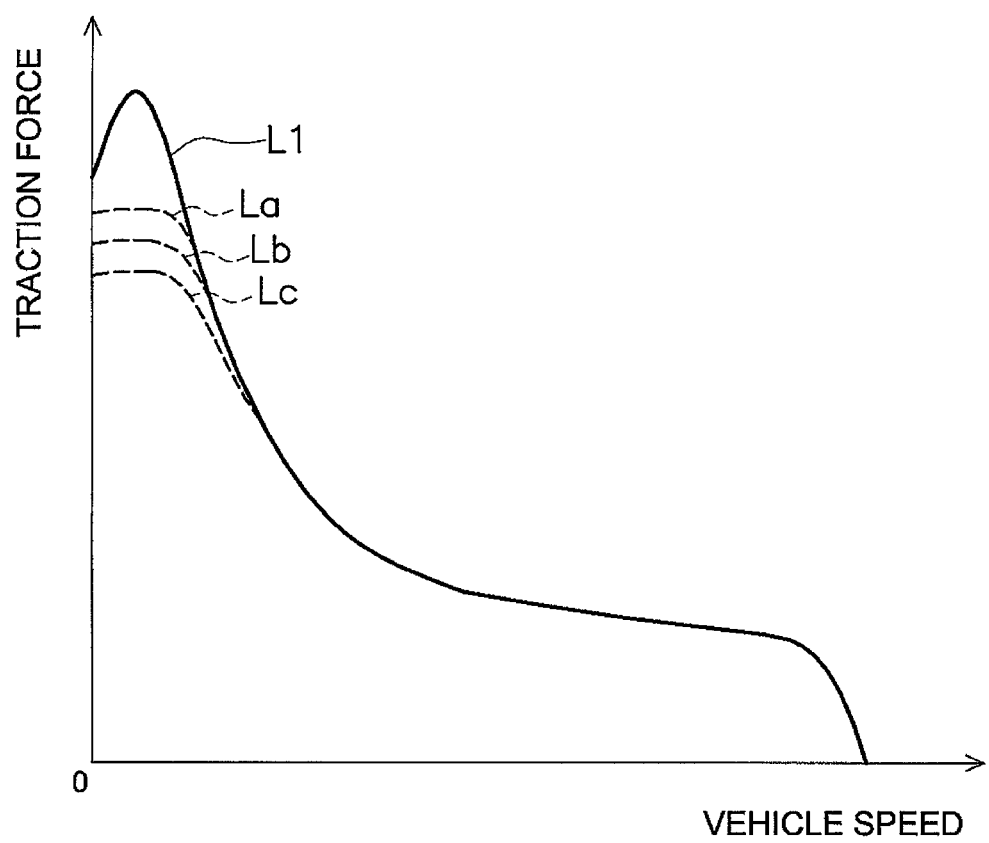
FIG. 6 is a view showing an example of the vehicle speed/ traction force graph for the work vehicle.

The vehicle body controller 12 processes output signals from the engine speed sensor 1a and the drive circuit pressure detector 17 and outputs a command signal for the motor displacement to the motor displacement control unit 11b. Here, the vehicle body controller 12 references the motor displacement/drive circuit pressure characteristic stored in the vehicle body controller 12 and sets the motor displacement from the values of the engine speed and drive circuit pressure. The vehicle body controller 12 outputs a command to change to a tilt angle that corresponds to the set motor displacement to the motor displacement control unit 11b. FIG. 5 shows an example of the motor displacement/drive circuit pressure characteristic. The solid line L21 in FIG. 5 is a line determining the motor displacement with respect to the drive circuit pressure when the engine speed is a certain value. The motor displacement in this case corresponds to the tilt angle of the travel hydraulic motor 10. The tilt angle is at minimum (Min) until the drive circuit pressure is equal to or less than a certain value. The tilt angle then also gradually increases (inclined portion L22 of the solid line) as the drive circuit pressure increases. After the tilt angle has reached maximum (Max), the tilt angle remains at the maximum tilt angle Max despite further increasing of the drive circuit pressure. The inclined portion L22 specifies the target pressure for the drive circuit pressure. Specifically, the vehicle body controller 12 increases the displacement of the travel hydraulic motor when the drive circuit pressure becomes larger than the target pressure. When the drive circuit pressure becomes smaller than the target pressure, the displacement of the travel hydraulic motor is reduced. The target pressure is determined according to the engine speed. Specifically, the inclined portion L22 shown in FIG. 5 is set so as to rise or fall in response to an increase or decrease of the engine speed. Specifically, control is performed so that when the engine speed is low, the tilt angle of the inclined portion L22 increases from a state in which the drive circuit pressure is lower, and the tilt angle reaches the maximum thereof in the state in which the drive circuit pressure is lower (see the dashed-line inclined portion L23 at the bottom in FIG. 5). Conversely, when the engine speed is high, control is performed so that the minimum tilt angle Min is maintained until the drive circuit pressure reaches a higher value, and the maximum tilt angle Max is reached in the state in which the drive circuit pressure is higher (see the dashed-line inclined portion L24 at the top in FIG. 5). The traction force and vehicle speed of the work vehicle are thereby varied in non-stage fashion, as shown in FIG. 6, and the vehicle speed can be automatically varied from zero to the maximum speed without a shifting operation.

The vehicle body controller 12 executes traction control in response to operation of the traction control selection member 15. Traction control is control for varying the maximum traction force of the vehicle through a plurality of stages by changing the maximum displacement of the travel hydraulic motor 10. The vehicle body controller 12 reduces the maximum displacement of the travel hydraulic motor 10 through a plurality of stages in response to operation of the traction control selection member 15. Specifically, as shown in FIG. 5, the vehicle body controller 12 outputs command signals to the motor displacement control unit 11b to change the maximum displacement from Max to Ma, Mb, or Mc. When the maximum displacement is changed to Ma, the vehicle speed/traction force characteristic varies according to the line La in FIG. 6. The maximum traction force thus decreases relative to the line L1 indicating the vehicle speed/traction force characteristic for the state in which traction control is not performed. When the maximum displacement is changed to Mb, the vehicle speed/traction force characteristic varies according to the line Lb, and the maximum traction force is further reduced. When the maximum displacement is changed to Mc, the vehicle speed/traction force characteristic varies according to the line Lc, and the maximum traction force is further reduced.

The vehicle body controller 12 performs control (hereinafter referred to as "throttle limiting control") for distinguishing the work phase of the work implement 52 and setting the upper limit of the throttle opening degree in accordance with the distinguished work phase. The engine controller 12a described above controls the output of the engine on the basis of the smaller of the throttle opening degree set by operation of the accelerator operation member 13a and the upper limit of the throttle opening degree set by the vehicle body controller 12. Throttle limiting control is described in detail hereinafter.

Figure 7:
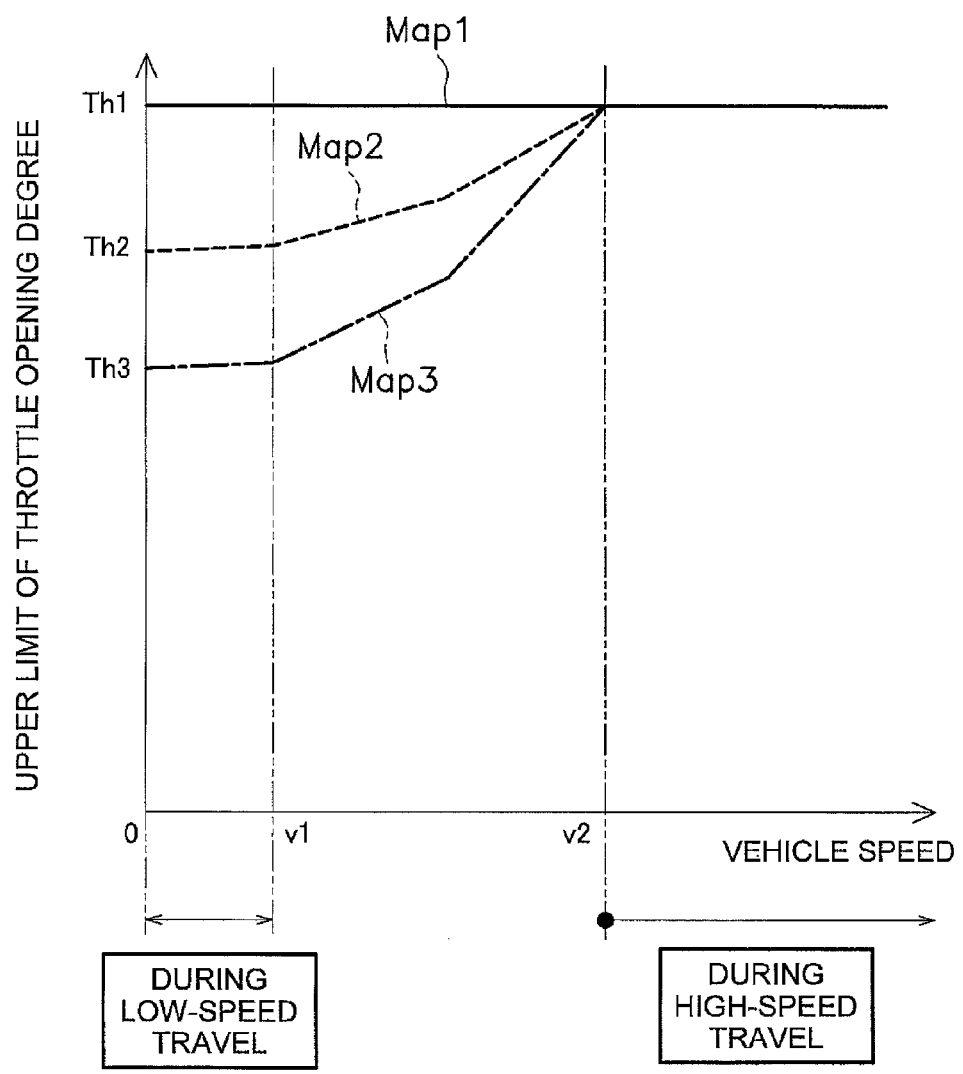
FIG. 7 is a view showing an example of the throttle upper limit map.

The vehicle body controller 12 sets the upper limit of the throttle opening degree on the basis of the throttle upper limit map shown in FIG. 7. The throttle upper limit map specifies the upper limit of the throttle opening degree with respect to the vehicle speed. The throttle upper limit map is an example of the throttle upper limit information of the present invention. As shown in FIG. 7, the throttle upper limit map includes a first throttle upper limit map Map1, a second throttle upper limit map Map2, and a third throttle upper limit map Map3. In the first throttle upper limit map Map1, the upper limit of the throttle opening degree is fixed at an opening degree Th1 irrespective of the vehicle speed. The opening degree Th1 matches the throttle opening degree when the accelerator operation amount is 100% in the normal state. Specifically, selecting the first throttle upper limit map Map1 means that an upper limit is not set for the throttle opening degree.

The second throttle upper limit map Map2 specifies an upper limit for the throttle opening degree that is lower than that of the first throttle upper limit map Map1 with respect to the vehicle speed. The third throttle upper limit map Map3 specifies an upper limit for the throttle opening degree that is lower than that of the second throttle upper limit map Map2 with respect to the vehicle speed. The second throttle upper limit map Map2 includes a characteristic whereby the upper limit of the throttle opening degree gradually increases in accordance with an increase in vehicle speed. The third throttle upper limit map Map3 includes a characteristic whereby the upper limit of the throttle opening degree gradually increases in accordance with an increase in vehicle speed. Specifically, in the second throttle upper limit map Map2, when the vehicle speed varies within the range from v1 to v2, the throttle opening degree increases in accordance with an increase in vehicle speed. In the third throttle upper limit map Map3, when the vehicle speed varies within the range from v1 to v2, the throttle opening degree increases in accordance with an increase in vehicle speed.

Figure 8:
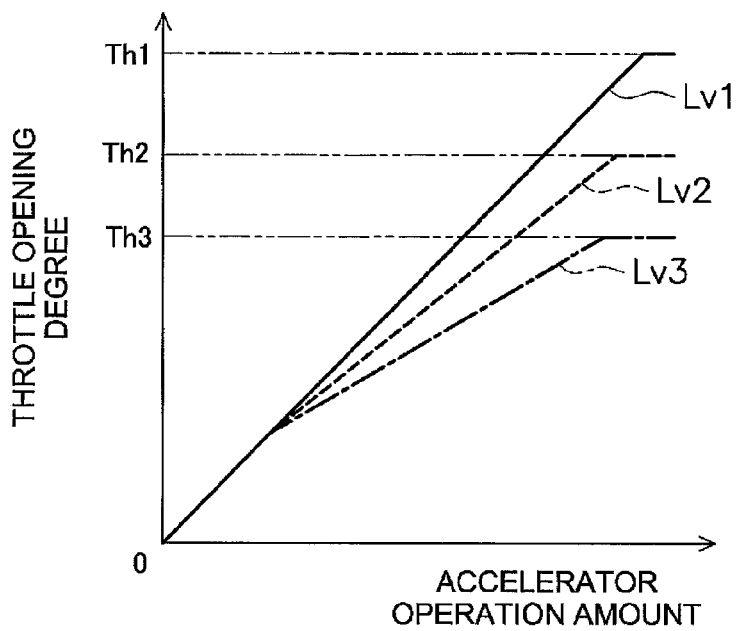
FIG. 8 is a view showing the relationship between the accelerator operation amount and the set throttle opening degree.
Figure 8:
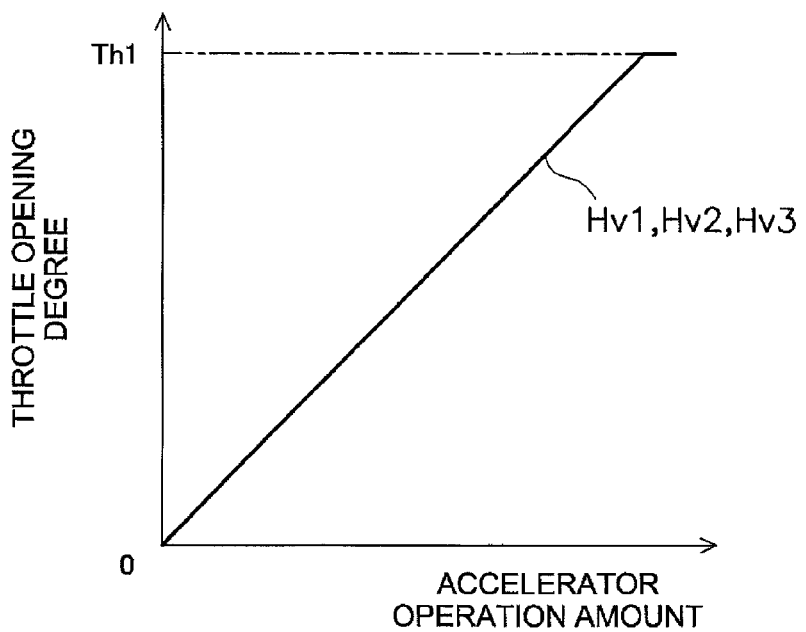

In the second throttle upper limit map Map2, the throttle opening degree is fixed at an opening degree Th2 when the vehicle speed is less than v1. In the third throttle upper limit map Map3, the throttle opening degree is fixed at an opening degree Th3 when the vehicle speed is less than v1. The opening degree Th3 is less than the opening degree Th2. FIG. 8(a) shows the relationship between the accelerator operation amount and the set throttle opening degree during low-speed travel in which the vehicle speed is less than v1. In FIG. 8(a), "Lv1" indicates the relationship between the accelerator operation amount and the set throttle opening degree when the first throttle upper limit map Map1 is selected during low-speed travel. "Lv2" indicates the relationship between the accelerator operation amount and the set throttle opening degree when the second throttle upper limit map Map2 is selected during low-speed travel. "Lv3" indicates the relationship between the accelerator operation amount and the set throttle opening degree when the third throttle upper limit map Map3 is selected during low-speed travel. As shown in FIG. 8(a), the throttle opening degree is set to a large value in response to an increase in the accelerator operation amount. However, when the first throttle upper limit map Map1 is selected, the opening degree Th1 becomes the upper limit of the throttle opening degree. When the second throttle upper limit map Map2 is selected, the opening degree Th2 becomes the upper limit of the throttle opening degree. When the third throttle upper limit map Map3 is selected, the opening degree Th3 becomes the upper limit of the throttle opening degree.

As shown in FIG. 7, in the second throttle upper limit map Map2, the throttle opening degree is fixed at the opening degree Th1 when the vehicle speed is greater than v2. In the third throttle upper limit map Map3 as well, the throttle opening degree is fixed at the opening degree Th1 when the vehicle speed is greater than v2. In other words, whether the second throttle upper limit map Map2 or the third throttle upper limit map Map3 is selected, the vehicle body controller 12 does not set an upper limit for the throttle opening degree when the vehicle speed is greater than v2. FIG. 8(b) shows the relationship between the accelerator operation amount and the set throttle opening degree during high-speed travel in which the vehicle speed is greater than v2. In FIG. 8(b), "Hv1" indicates the relationship between the accelerator operation amount and the set throttle opening degree when the first throttle upper limit map Map1 is selected during high-speed travel. "Hv2" indicates the relationship between the accelerator operation amount and the set throttle opening degree when the second throttle upper limit map Map2 is selected during high-speed travel. "Hv3" indicates the relationship between the accelerator operation amount and the set throttle opening degree when the third throttle upper limit map Map3 is selected during high-speed travel. As shown in FIG. 8(b), a throttle opening degree that is in accordance with the accelerator operation amount is set regardless of which of the first through third throttle upper limit maps Map1 through Map3 is set. The opening degree Th1 becomes the upper limit of the throttle opening degree.

Figure 9:
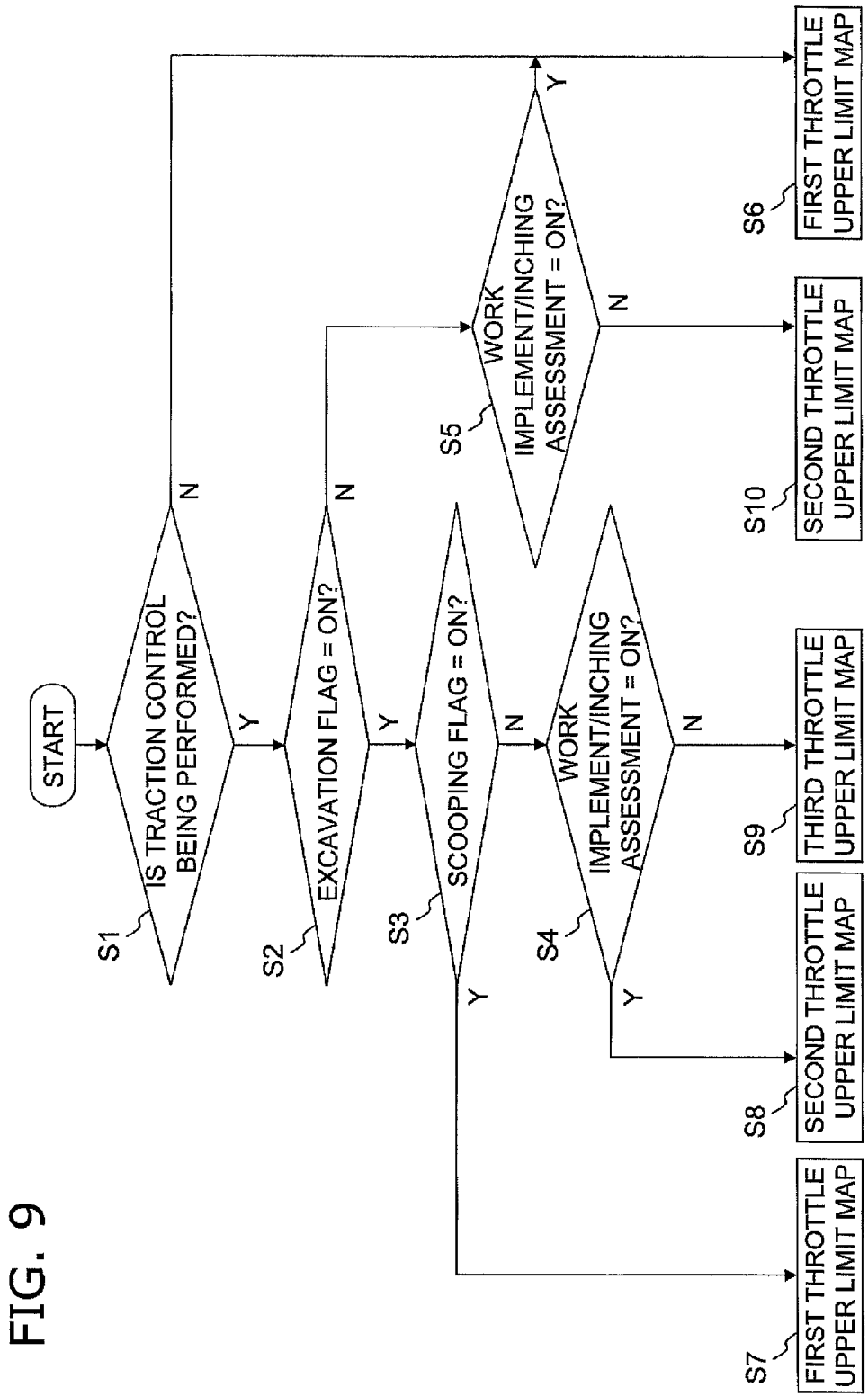
FIG. 9 is a flowchart showing the assessment process in throttle limiting control.

The conditions for selecting the first through third throttle upper limit maps Map1 through Map3 in throttle limiting control will next be described. FIG. 9 is a flowchart showing the assessment process in throttle limiting control. In the first step S1, an assessment is made as to whether traction control is being performed. On the basis of an operation signal from the traction control selection member 15, the vehicle body controller 12 assesses whether traction control is being performed. When traction control is not being performed, the first throttle upper limit map Map1 is selected in step S6. When traction control is being performed, the process proceeds to step S2.

In step S2, an assessment is made as to whether an excavation flag is "ON." For the excavation flag to be "ON" means that the work phase is in a state of excavation. Specifically, the excavation flag is set to "ON" when condition 1-1 or condition 1-2 below is satisfied, and condition 1-3 and condition 1-4 are satisfied.

Figure 10:
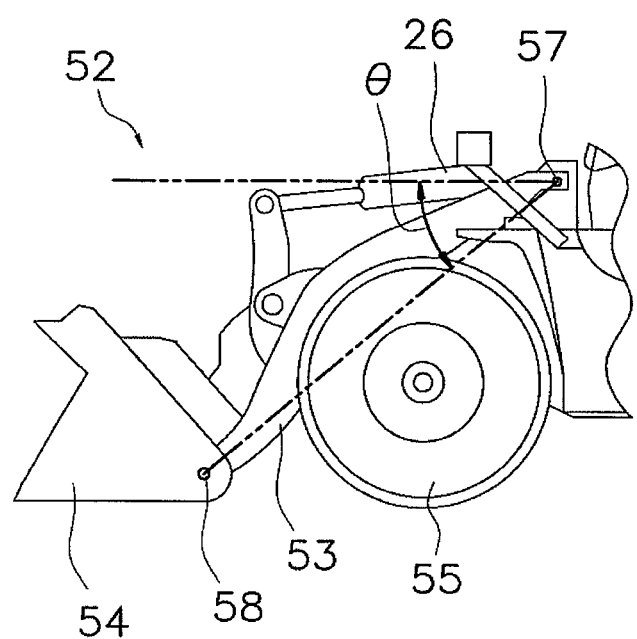
FIG. 10 is a view showing the definition of the boom angle.

Condition 1-1 is that a boom bottom pressure lower than a predetermined reference boom bottom pressure has been detected continuously for a predetermined time or longer in a case in which the boom angle is equal to or greater than a predetermined angle threshold and is less than zero degrees. As shown in FIG. 10, the boom angle is the angle θ between the horizontal direction, which is zero degrees, and a line connecting a boom pin 57 and a bucket pin 58 as viewed from the side. Angles below the horizontal direction have negative values, and angles higher than the horizontal direction have positive values. The boom angle is defined so as to increase in the upward direction. The predetermined angle threshold corresponds to the boom angle at which the work implement 52 is positioned on the ground surface. The boom bottom pressure is detected by the boom pressure sensor 22. The predetermined reference boom bottom pressure is specified in relation to the boom angle, and the reference boom bottom pressure also generally increases as the boom angle increases. The predetermined time is set to an extremely small value, such as one second.

Condition 1-2 is that a boom bottom pressure lower than the reference boom bottom pressure when the boom angle is zero degrees is detected continuously for a predetermined time or longer in a case in which the boom angle is zero degrees or greater. The predetermined time is set to an extremely small value, such as one second.

Condition 1-3 is that the boom bottom pressure is equal to or greater than a predetermined boom bottom pressure threshold. The predetermined boom bottom pressure threshold corresponds to the boom bottom pressure in a state in which the work implement 52 is positioned on the ground surface.

Condition 1-4 is that the boom angle is equal to or less than a predetermined boom angle threshold. The boom angle threshold is set to a value less than zero degrees that may occur during excavation work.

In step S2, when the excavation flag is assessed to be "ON," the process proceeds to step S3. The excavation flag is set to "OFF" when condition 1-1' or condition 1-2' described below is satisfied.

Condition 1-1' is that the boom bottom pressure reduction flag is "ON." The boom bottom pressure reduction flag is set to "ON" when condition 1-1 or condition 1-2 described above is satisfied.

Condition 1-2' is that the forward/reverse switching operation member 14 is at a position other than the forward position; i.e., the forward/reverse switching operation member 14 is at the reverse position or the neutral position.

In step S3, an assessment is made as to whether a scooping flag is "ON." For the scooping flag to be "ON" means that a scooping operation is being performed. Specifically, the scooping flag is set to "ON" when condition 2-1 and condition 2-2 described below are satisfied.

Condition 2-1 is that the abovementioned excavation flag is "ON."

Condition 2-2 is that the boom angle is greater than the abovementioned predetermined boom angle threshold.

In step S3, when the scooping flag is assessed to be "ON," the first throttle upper limit map Map1 is selected in step S7. When the scooping flag is assessed to not be "ON" in step S3, the process proceeds to step S4.

In step S4, an assessment is made as to whether a work implement/inching assessment is "ON." For the work implement/inching assessment to be "ON" means that the work implement 52 or the inching function is being used. Specifically, the work implement/inching assessment is set to "ON" when condition 3-1, 3-2, or 3-3 described below is satisfied.

Condition 3-1 is that the discharge pressure of the second hydraulic pump is greater than a predetermined first discharge pressure threshold. The value set for the predetermined first discharge pressure threshold is one that can occur when the work implement 52 or a steering cylinder (not shown) is being used.

Condition 3-2 is that the boom raising PPC pressure is greater than a predetermined first pilot pressure threshold. The boom raising PPC pressure is the pilot pressure outputted from the work implement operation member 23 during an operation (hereinafter referred to as "boom-raising operation") for elevating the boom 53. The value set for the predetermined first pilot pressure threshold is one that can occur when the work implement operation member 23 is being operated to raise the boom.

Condition 3-3 is that the operation amount of the inching operation member 27a is greater than a predetermined first inching operation threshold. The value set for the predetermined first inching operation threshold is one that can occur when the inching operation member 27a is being operated.

In step S4, when the work implement/inching assessment is assessed to be "ON," the second throttle upper limit map Map2 is selected in step S8. When the work implement/inching assessment is assessed to not be "ON" in step S4, the third throttle upper limit map Map3 is selected in step S9.

The work implement/inching assessment is set to "OFF" when conditions 3-1', 3-2', and 3-3' described below are satisfied.

Condition 3-1' is that the discharge pressure of the second hydraulic pump is less than a predetermined second discharge pressure threshold. The predetermined second discharge pressure threshold is less than the first discharge pressure threshold. The value set for the predetermined second discharge pressure threshold is one that may indicate that the work implement 52 or the steering cylinder (not shown) is not being used.

Condition 3-2' is that the boom raising PPC pressure is less than a predetermined second pilot pressure threshold. The predetermined second pilot pressure threshold is less than the first pilot pressure threshold. The value set for the predetermined second pilot pressure threshold is one that may indicate that the work implement operation member 23 is not being operated to raise the boom. Specifically, even when the boom raising PPC pressure is not zero, condition 3-2' is assessed to be satisfied when the boom raising PPC pressure is small enough to indicate that the work implement operation member 23 is not being operated to raise the boom.

Condition 3-3' is that the operation amount of the inching operation member 27a is less than a predetermined second inching operation threshold. The value set for the predetermined second inching operation threshold is one that may indicate that the inching operation member 27a is not being operated. Specifically, even when the operation amount of the inching operation member 27a is not zero, condition 3-3' is assessed to be satisfied when the operation amount of the inching operation member 27a is small enough to indicate that the inching operation member 27a is not being operated.

When the excavation flag is assessed to not be "ON" in step S2, the process proceeds to step S5. In step S5, an assessment is made as to whether the work implement/inching assessment is "ON," in the same manner as in step S4. When the work implement/inching assessment is assessed to be "ON," the first throttle upper limit map Map1 is selected in step S6. When the work implement/inching assessment is assessed to not be "ON," the second throttle upper limit map Map2 is selected in step S10.

Figure 12:
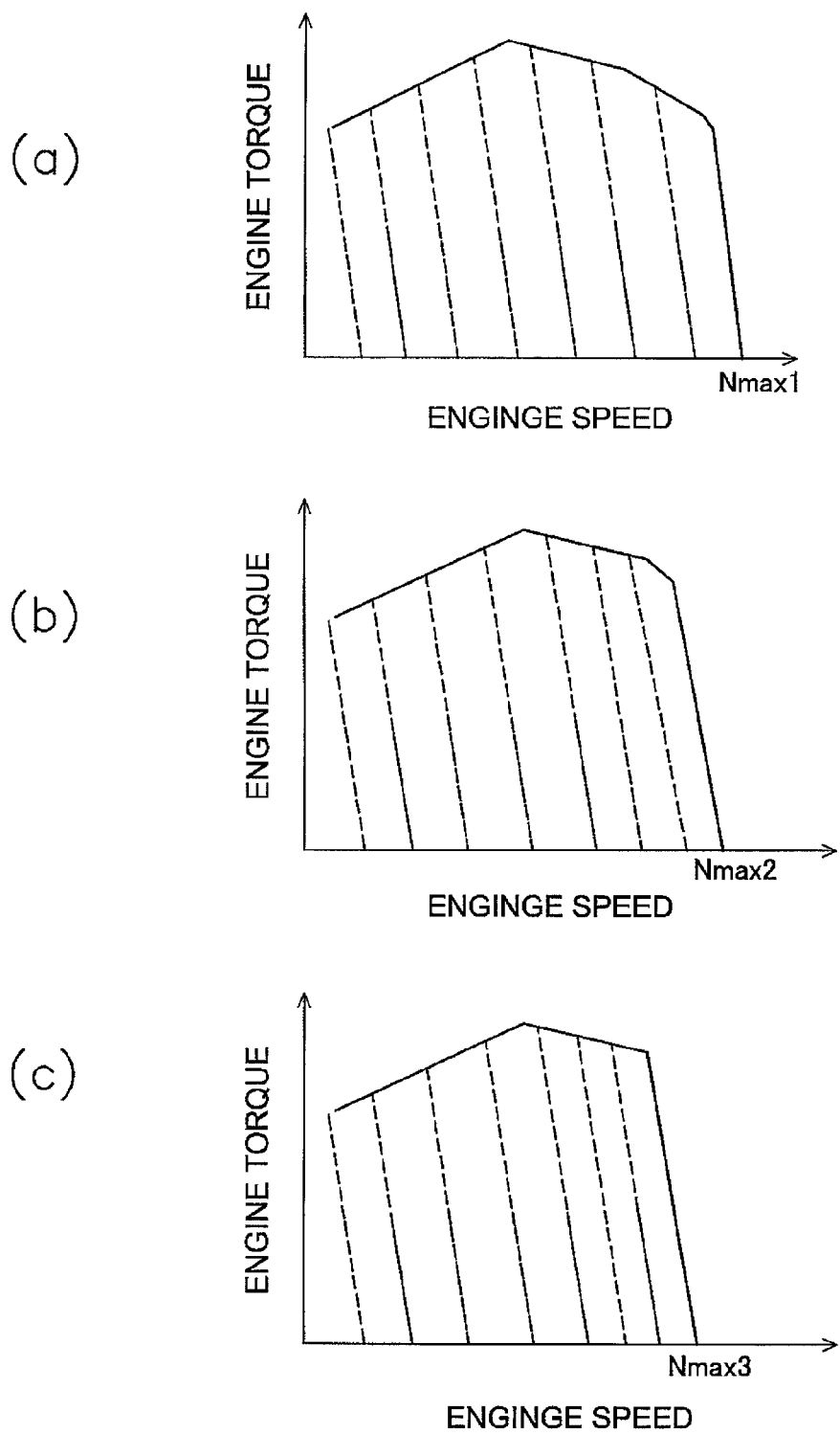
FIG. 12 is a view showing the output torque curve of the engine when each throttle upper limit map is selected.
Figure 13:
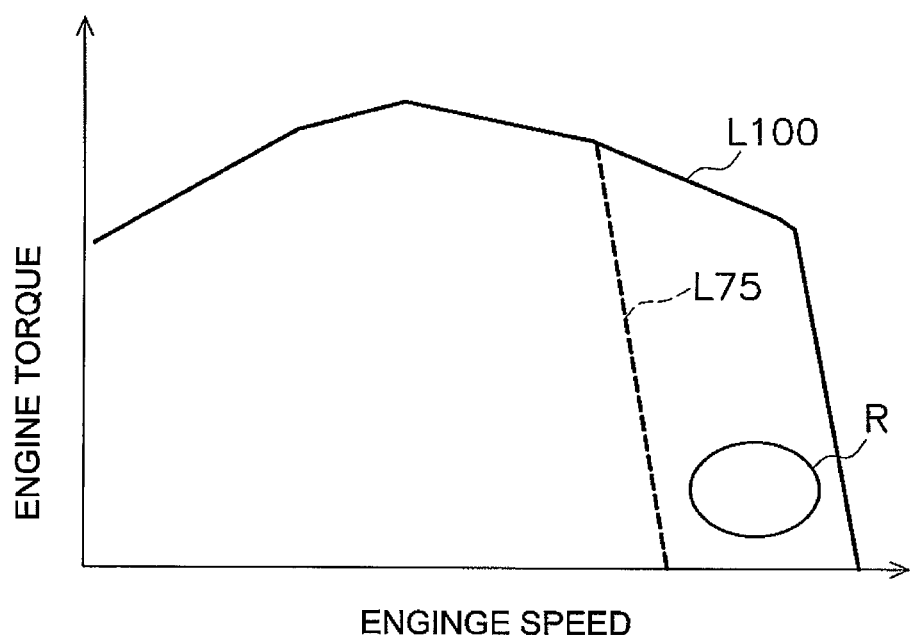
FIG. 13 is a view showing an example of the output torque curve of the engine in the conventional technique.

As described above, the throttle upper limit map that is appropriate according to the current work phase is selected in the work vehicle 50 according to the present embodiment. FIG. 11 is a table showing the throttle upper limit map selected for each work phase. As shown in FIG. 11, when traction control is not being performed, different throttle upper limit maps are selected according to whether the work phase is excavation or work other than excavation. In an instance in which the usage conditions for the work implement or the inching function are the same, when the work phase is excavation, a throttle upper limit map is selected in which the upper limit of the throttle opening degree is less than that of a work phase other than excavation. Consequently, when the work phase is excavation, the upper limit of the throttle opening degree is reduced to a value less than that of a work phase other than excavation. The output of the engine 1 is thereby restrained. FIG. 12 shows the output torque curve of the engine 1 when each throttle upper limit map Map1 through Map3 is selected. Specifically, FIG. 12(*a*) shows the output torque curve of the engine 1 when the first throttle upper limit map Map1 is selected. FIG. 12(*b*) shows the output torque curve of the engine 1 when the second throttle upper limit map Map2 is selected. FIG. 12(*c*) shows the output torque curve of the engine 1 when the third throttle upper limit map Map3 is selected. As shown in FIG. 12, the maximum value Nmax2 that occurs for the engine speed when the second throttle upper limit map Map2 is selected is less than the maximum value Nmax1 that occurs when the first throttle upper limit map Map1 is selected. Moreover, the maximum value Nmax3 that occurs for the engine speed when the third throttle upper limit map Map3 is selected is less than the maximum value Nmax2 that occurs when the second throttle upper limit map Map2 is selected. Engine fuel economy can thus be enhanced by restraining the output of the engine. There is no need for a high flow rate to the travel hydraulic motor 10 when the work phase is excavation. Reducing the upper limit of the throttle opening degree therefore has minimal effect on travel characteristics. As described above, the second throttle upper limit map Map2 and the third throttle upper limit map Map3 have characteristics whereby the upper limit of the throttle opening degree gradually increases in accordance with an increase in vehicle speed. Sharp variations in the throttle opening degree are therefore suppressed. It is thereby possible to suppress shocks produced in the work vehicle. Furthermore, in the second throttle upper limit map Map2 and the third throttle upper limit map Map3, the upper limit of the throttle opening degree is fixed at Th1 when the vehicle speed is greater than the predetermined speed v2. Specifically, the vehicle body controller 12 does not set an upper limit for the throttle opening degree when the vehicle speed is greater than the predetermined speed v2. Adverse effects on travel characteristics during high-speed travel can thereby be suppressed.

When the work phase is the same, during use of the work implement 52 or the inching function, a throttle upper limit map is selected in which the upper limit of the throttle opening degree is greater than the value thereof that occurs when the work implement 52 or the inching function is not in use. Consequently, when the work implement 52 or the inching function is in use, the upper limit of the throttle opening degree is increased to a value higher than the value thereof when the work implement 52 or the inching function is not in use. Ease of operation is therefore kept from decreasing.

The first throttle upper limit map Map1 is selected during scooping work. Specifically, an upper limit is not set for the throttle opening degree during scooping work. A large load is placed on the lift cylinder 19 during scooping work. Therefore, by selecting the first throttle upper limit map Map1 during scooping work, ease of operation is kept from decreasing.

The first throttle upper limit map Map1 is selected when traction control is not being performed. Specifically, an upper limit is not set for the throttle opening degree when traction control is not being performed. The operator usually turns off the traction control during work in which a large traction force is required. Consequently, since the first throttle upper limit map Map1 is selected when traction control is not being performed, ease of operation can be kept from decreasing.

An embodiment of the present embodiment is described above, but the present invention is not limited by the above embodiment, and various modifications to this embodiment are possible within the intended scope of the invention.

In the above embodiment, an example is described in which the work vehicle to which the present invention is applied is a wheel loader. However, the present invention is not limited to this configuration. For example, the present invention may also be applied to other work vehicles equipped with an HST.

In the above embodiment, an example is described of a work vehicle 50 equipped with a one-pump one-motor HST system that includes one hydraulic pump and one travel hydraulic motor 10. However, the present invention is not limited to this configuration. For example, the present invention may also be applied to a work vehicle equipped with a one-pump two-motor HST system that includes one first hydraulic pump and two travel hydraulic motors.

In the above embodiment, the upper limit of the throttle opening degree is reduced when the work phase is excavation. However, the upper limit of the throttle opening degree may be reduced when the work phase is a predetermined work other than excavation. The predetermined work is preferably work in which the load on the travel hydraulic motor is small.

In the above embodiment, the inching operation member 27a serves also as a brake pedal. However, the inching operation member may also be provided as a separate member from the brake pedal.

In the above embodiment, throttle upper limit maps are used as the throttle upper limit information. However, the throttle upper limit information is not limited to being in the form of a map, and may be configured in another format such as a table or an arithmetic expression.

The illustrated embodiment makes it possible to provide a work vehicle and method for controlling a work vehicle whereby fuel economy can be enhanced with minimal reduction in travel characteristics or ease of operation of the work vehicle.

What is claimed is:

1. A work vehicle comprising:
   an engine;
   a throttle opening degree setting unit configured to set a throttle opening degree of the engine;
   a first hydraulic pump driven by the engine;
   a travel hydraulic motor driven by hydraulic fluid discharged from the first hydraulic pump;
   a second hydraulic pump driven by the engine;
   a work implement driven by hydraulic fluid discharged from the second hydraulic pump, the work implement having a bucket and a boom for supporting the bucket;
   a first control unit configured to set an upper limit for the throttle opening degree in accordance with a determination result as to whether or not the work vehicle is performing excavation work; and
   a second control unit configured to control output of the engine based on the smaller of the throttle opening degree set by the throttle opening degree setting unit and the throttle opening degree set by the first control unit, wherein
   the first control unit is configured to set the upper limit of the throttle opening degree based on throttle upper limit information for specifying the upper limit of the throttle opening degree with respect to vehicle speed,
   the throttle upper limit information includes first throttle upper limit information, second throttle upper limit information for specifying a lower upper limit of the throttle opening degree with respect to the vehicle speed than the first throttle upper limit information, and third throttle upper limit information for specifying a lower upper limit of the throttle opening degree with respect to the vehicle speed than the second throttle upper limit information,
   the first control unit is configured to set the upper limit of the throttle opening degree based on the third throttle upper limit information when the determination result indicates that the work vehicle is performing excavation work and when the work implement is not in use,
   the first control unit is configured to set the upper limit of the throttle opening degree based on the second throttle upper limit information when the determination result indicates that the work vehicle is performing excavation work and when the work implement is in use, and
   the first control unit is configured set the upper limit of the throttle opening degree based on the first throttle upper limit information when an angle in a longitudinal direction of the boom, defined so that a value of the angle increases upward, is equal to or greater than a predetermined angle, even when the determination result indicates that the work vehicle is performing excavation work.

2. The work vehicle according to claim 1, wherein
   the throttle upper limit information includes a characteristic whereby the upper limit of the throttle opening degree gradually increases in accordance with an increase in vehicle speed.

3. The work vehicle according to claim 1, wherein
   the first control unit is configured not to set an upper limit of the throttle opening degree when a vehicle speed is greater than a predetermined speed.

4. The work vehicle according to claim 1, further comprising
   an inching operation member configured to reduce vehicle speed, wherein
   the first control unit is configured to determine whether the inching operation member is in use, and when the inching operation member is in use, the first control unit is configured to increase the upper limit of the throttle opening degree to a value higher than a value thereof when the inching operation member is not in use.

5. A method for controlling a work vehicle including an engine, a throttle opening degree setting unit for setting a throttle opening degree of the engine, a first hydraulic pump driven by the engine, a travel hydraulic motor driven by hydraulic fluid discharged from the first hydraulic pump, a second hydraulic pump driven by the engine, and a work implement having a bucket and a boom driven by hydraulic fluid discharged from the second hydraulic pump; the method comprising:
   determining whether the work vehicle is performing excavation work;
   setting an upper limit of the throttle opening degree in accordance with a determination result as to whether the work vehicle is performing excavation work; and
   controlling output of the engine based on the smaller of the throttle opening degree set by the throttle opening degree setting unit and the throttle opening degree set by the setting of the upper limit of the throttle opening degree in accordance with the determination result;
   the setting of the upper limit of the throttle opening degree including setting the upper limit based on throttle upper limit information for specifying the upper limit of the throttle opening degree with respect to vehicle speed, the throttle upper limit information including first throttle upper limit information, second throttle upper limit information for specifying a lower upper limit of the throttle opening degree with respect to the vehicle speed than the first throttle upper limit information, and third throttle upper limit information for specifying a lower upper limit of the throttle opening degree with respect to the vehicle speed than the second throttle upper limit information,
   the setting of the upper limit of the throttle opening degree further including
      setting the upper limit of the throttle opening degree based on the third throttle upper limit information when the determination result indicates that the work vehicle is performing excavation work and when the work implement is not in use,
      setting the upper limit of the throttle opening degree based on the second throttle upper limit information when the determination result indicates that the work vehicle is performing excavation work and when the work implement is in use, and setting the upper limit of the throttle opening degree based on the first throttle upper limit information when an angle in a longitudinal direction of the boom, defined so that a value of the angle increases upward, is equal to or greater than a predetermined angle, even when the determination result indicates that the work vehicle is performing excavation work.

* * * * *